United States Patent [19]

Wells

[11] 4,173,261
[45] Nov. 6, 1979

[54] AGRICULTURAL FURROWING ASSEMBLY

[75] Inventor: Willis Wells, Storm Lake, Iowa

[73] Assignee: Royal Industries, Inc., a subsidiary of Lear Siegler, Inc., Sac City, Iowa

[21] Appl. No.: 799,553

[22] Filed: May 23, 1977

[51] Int. Cl.² ............................................. A01B 17/00
[52] U.S. Cl. ................................... 172/136; 172/202
[58] Field of Search .................... 172/1, 202, 34, 136, 172/142, 201, 203, 198, 71, 72, 705, 707, 708, 710, 711, 265, 163, 195, 182

[56] References Cited

U.S. PATENT DOCUMENTS

| 728,535 | 5/1903 | Brady | 172/136 |
|---|---|---|---|
| 1,281,676 | 10/1918 | Shepard | 172/202 |
| 1,418,410 | 6/1922 | Wallace | 172/202 |
| 2,562,625 | 7/1951 | Lothen | 172/201 X |
| 3,556,227 | 1/1971 | Homdrom | 172/701 |
| 3,574,320 | 4/1971 | Sigmund | 172/710 |
| 3,700,039 | 10/1972 | Essex | 172/265 |
| 3,991,831 | 11/1976 | Foster | 172/705 |

FOREIGN PATENT DOCUMENTS

2051599 5/1972 Fed. Rep. of Germany ........... 172/198
922353 3/1963 United Kingdom ..................... 172/202

OTHER PUBLICATIONS

Modern Farmers' Cyclopedia of Agriculture, E. V. Wilcox, 1952, Orange Judd, N.Y.

Primary Examiner—Richard J. Johnson
Attorney, Agent, or Firm—Wegner, Stellman, McCord, Wiles & Wood

[57] ABSTRACT

An assembly for creating furrows in a freshly plowed field. The furrows, two to three feet apart, are usually created in the fall and are useful for retaining moisture in the soil during the winter months and are helpful in preventing soil erosion by the wind. The furrowing assembly is detachably mounted on a mulcher bar assembly which is mounted to a moldboard plow. The mulcher bar assembly includes an elongated bar having several chisel-type field cultivators downwardly extending in a soil-engaging position. The orientation of the mulcher bar may be reversed so that rod-like teeth members extending therefrom are in a soil-engaging position for mulching in the spring. Thus, depending upon the orientation of the mulcher bar, the apparatus may be used for either mulching or furrowing.

7 Claims, 5 Drawing Figures

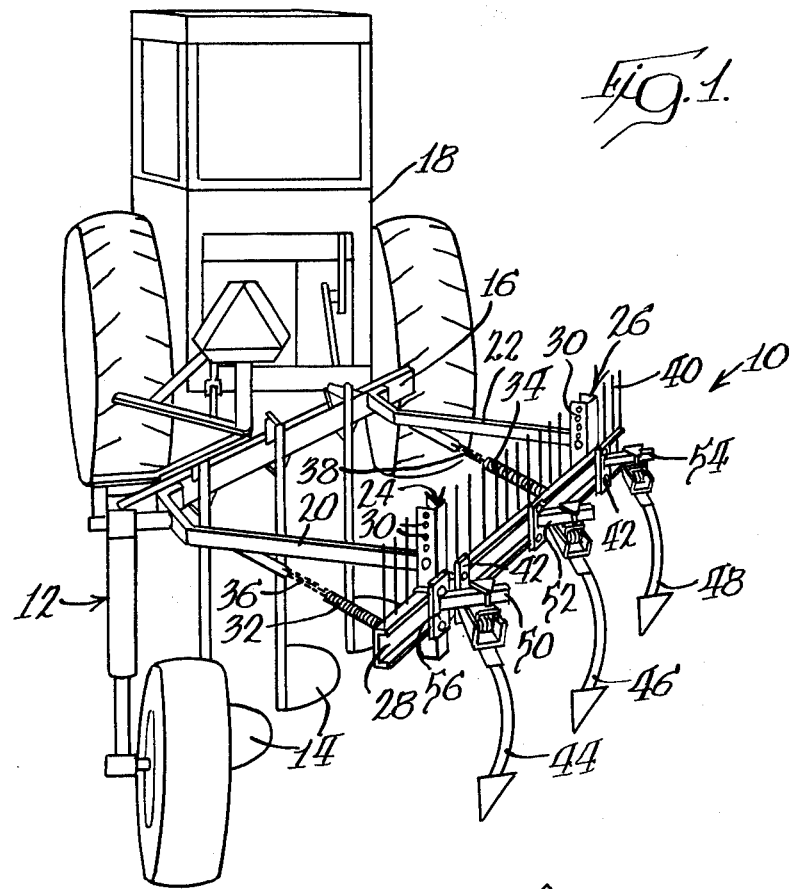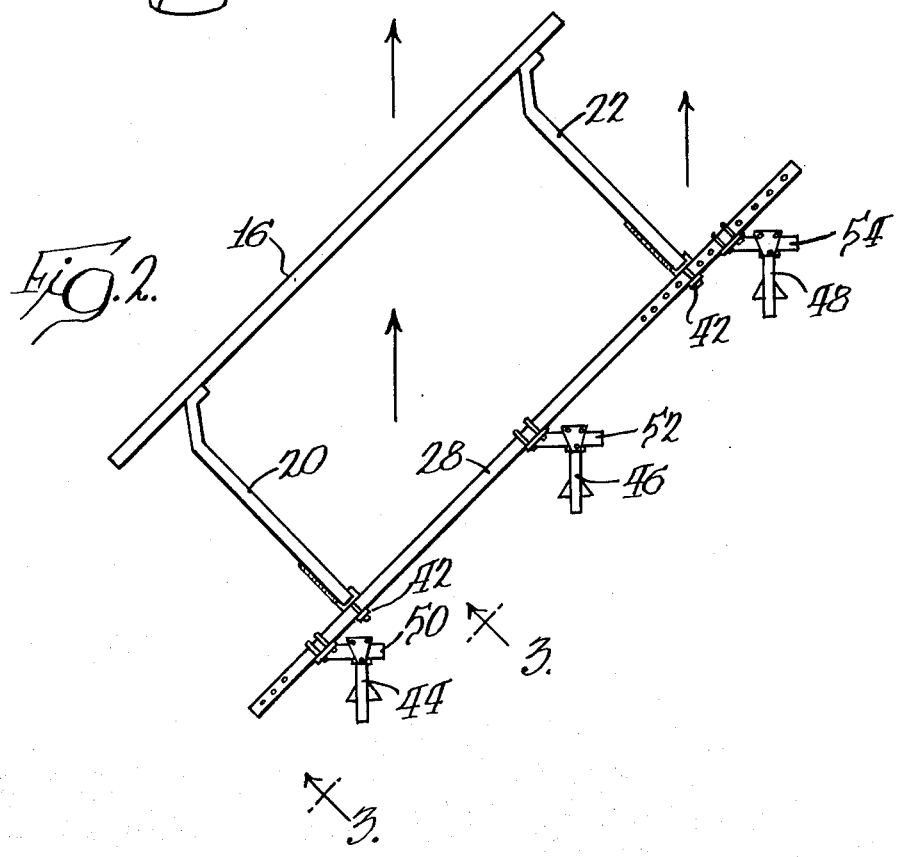

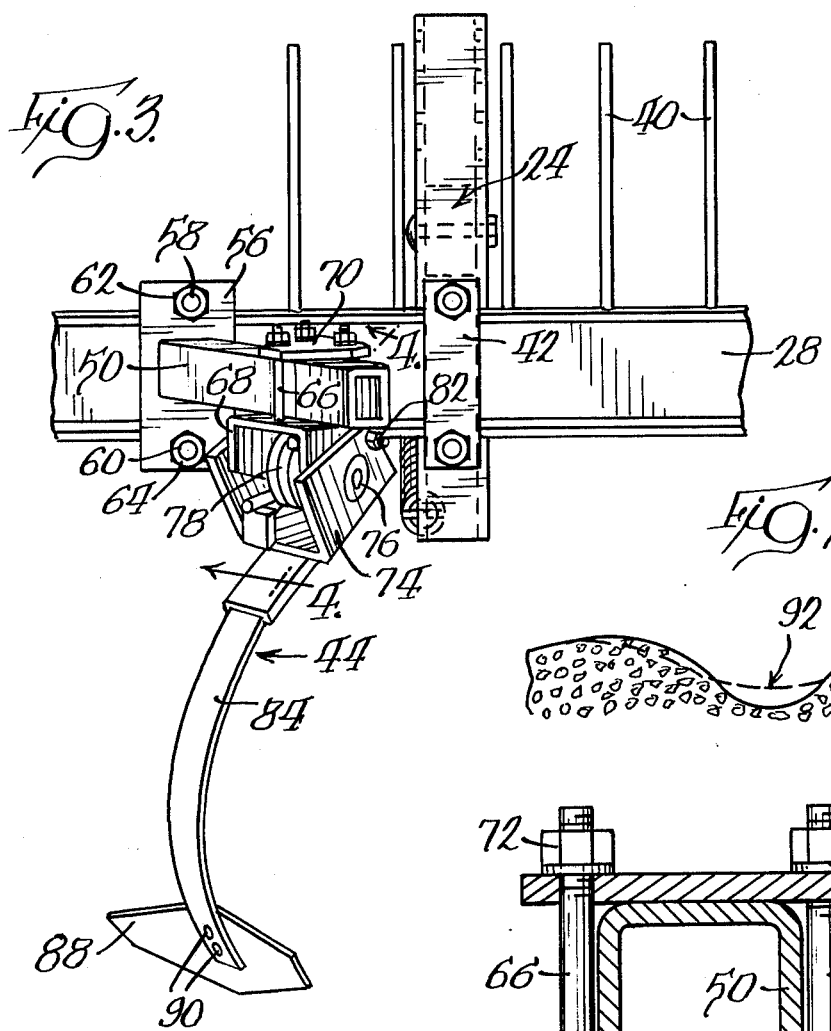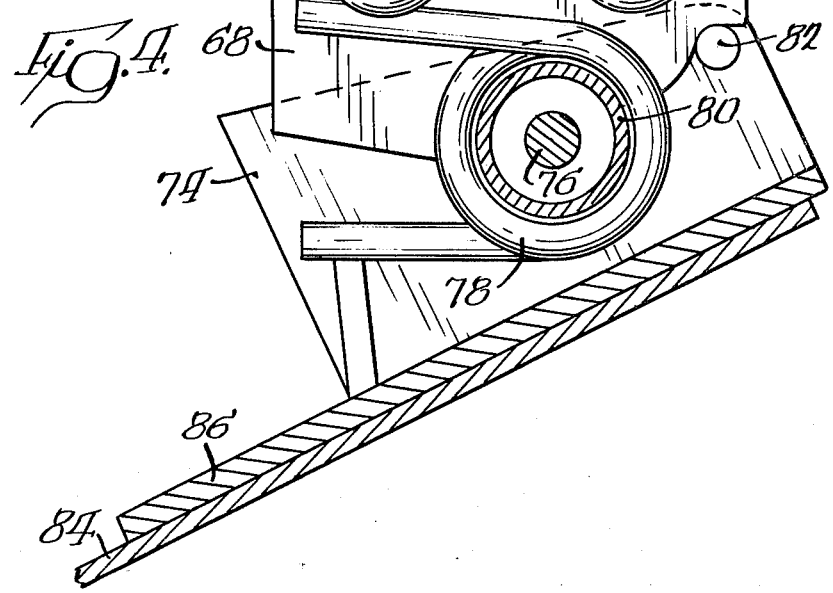

AGRICULTURAL FURROWING ASSEMBLY

BACKGROUND OF THE INVENTION

This invention relates to farm implements and, more particularly, to a furrowing attachment which may be mounted on existing equipment to create furrows immediately after plowing.

A mulcher bar assembly adapted for use with a plow and designed to trail the plow to mulch the freshly turned soil is disclosed in Sigmund U.S. Pat. No. 3,574,320. That apparatus is for conditioning the soil for planting after plowing in the spring. The rod-like teeth of the apparatus have a tendency to break up large clods of soil. The apparatus as disclosed by Sigmund has little utility in the fall since the ground usually has less moisture content and therefore fewer large clods, and there is no particular need to break up the large clods that do appear.

I have realized that it is desirable to create furrows in the soil approximately two to three feet apart after the fall plowing. The furrows capture blowing soil, water and snow, and therefore minimize soil loss and lessen erosion.

I have developed an apparatus for creating furrows which mounts on existing equipment which has not heretofore been of general use in the fall. The furrowing may be accomplished with little additional cost if done during the same time as the fall plowing.

SUMMARY OF THE INVENTION

Several field cultivators are attached to an elongated mulcher bar assembly which is pulled by a tractor during plowing to create furrows in the soil two to three feet apart. The mulcher bar assemblies are spaced apart by a distance determined by the distance between the moldboard plows for optimum results. The mulcher bar is inverted so that the rod-like teeth are not in a soil-engaging position. The furrows created by the apparatus are particularly useful in the fall and minimize soil loss and lessen erosion.

It is a feature of the present invention to provide an apparatus for creating furrows in freshly plowed soil.

Another feature of the present invention is to provide maximum use of existing farm equipment to create the furrows and to create the furrows while plowing.

Another feature of the present invention is to provide a mulcher and furrowing assembly which, depending upon the orientation of the elongated bar, either mulches or creates furrows in the freshly plowed soil.

These and other features of the invention will become apparent when considering the specification in combination with the drawing in which:

DRAWING

FIG. 1 is a view of the furrowing assembly in its soil-engaging position and being pulled by a tractor;

FIG. 2 is a top view of the furrowing assembly of FIG. 1;

FIG. 3 is a side view of a field cultivator in its soil-engaging position as seen on line 3—3 in FIG. 2;

FIG. 4 is an enlarged detail side view of the field cultivator taken along line 4—4 in FIG. 3; and FIG. 5 is a diagrammatic cross-sectional view of a portion of a field which has been plowed and furrowed in accordance with the present invention.

DESCRIPTION OF PREFERRED EMBODIMENT

Referring to FIGS. 1 and 2, furrowing assembly 10 is secured to plow 12 which has a plurality of bottoms and moldboards 14 of known construction. The plow may be of a variety of sizes, and depending on the size, the distance between bottoms is typically 16 inches, 18 inches or 20 inches. Plow 12 has a main plow beam 16 rigidly attached to the plow and positioned above the bottoms 14. Tractor 18 is coupled to plow 12 in the well known manner. Furrowing assembly 10 includes at least two generally parallel, spaced-apart support arms 20 and 22 each having a front end detachably secured to the main plow beam 16 by suitable bolted brackets (not shown). The rear ends of the support arms 20 and 22 are pivotably attached to generally upright support bars 24 and 26, which support bars rigidly support an elongated mulcher bar 28 in the form of a channel, angle iron or beam section. The position of mulcher bar 28 is adjustable up and down with respect to support arms 20 and 22 by a bolt through adjustment holes 30. Adjustable spring means 32 and 34 couple support arms 20 and 22 to support bars 24 and 26, respectively. Chains 36 and 38 provide adjustment of the tension for springs 32 and 34. In the event that the furrowing assembly 10 encounters a foreign object in the soil during operation, support bars 24 and 26 and mulcher bar 28 pivot about the support arms 20 and 22 as the tractor 18 travels in the direction of the arrows shown in FIG. 2. In addition, the chain and spring arrangement urges the mulcher bar downwardly toward the soil when in use.

Mulcher bar 28 has a single row of rod-like teeth 40 extending from one side thereof. As shown in FIG. 1, the teeth 40 are upwardly extending. Brackets 42 retain mulcher bar 28 against support bars 24 and 26. Mulcher bar 28 may be inverted so that teeth 40 engage the soil. In such a position, mulcher bar 28 trails the plow 12 to mulch the freshly turned soil, as more fully explained in Sigmund U.S. Pat. No. 3,574,320. When the mulcher bar 28 is in the position shown in FIG. 1, field cultivators 44, 46 and 48, coupled to short tool bars 50, 52 and 54, extend downwardly in a soil-engaging position to create furrows in the freshly plowed soil. Thus, depending upon the orientation of the mulcher bar 28 and the field cultivators 44, 46 and 48, the apparatus may be used for mulching or furrowing.

Referring to FIGS. 3 and 4, the field cultivator 44 is shown coupled to short tool bar 50 rigidly attached to mounting plate 56. Field cultivator 44 is representative of the construction of the field cultivators. Short tool bar 50, 8–10 inches long, is attached to mounting plate 56 such that its axis is generally perpendicular to the direction of travel as best shown in FIG. 2. Mounting plate 56, having bores 58 and 60, receives bolts 62 and 64 through a back plate on the opposite side of mulcher bar 28. Field cultivator 44 is mounted on short tool bar 50 by bolts 66 which extend through U-shaped bracket 68 and retaining plate 70. Nuts 72 are tightened to assure engagement of the field cultivator 44 with short tool bar 50. U-shaped bracket 68 opens downwardly and is received in an upwardly opening shank holder 74. Holder 74 is hinged to U-shaped bracket 68 by pin 76. Torsion spring 78, mounted on spindle 80 and held by pin 76, urges holder 74 downwardly with respect to U-shaped bracket 68. Bolt 82, secured through each side of holder 74, provides a stop to restrict downward movement of shank 84.

Shank 84 is retained by housing 86 which is welded to the undersurface of the holder 74. Shank 84 is an arcuate member of spring steel or the like, and is of sufficient thickness so as not to permanently deform during flexing operation. Shank 84 may be attached to the housing 86 by bolts (not shown). Shank 84 has a field cultivator plowshare 88 secured at its end by bolts 90. As best seen in FIG. 2, the face of cultivator plowshare 88 is perpendicular to the desired travel of tractor 18.

The field cultivators 44, 46 and 48 are mounted on the elongated mulcher bar 28 to create furrows deepening the natural lesser furrows made by moldboard plows. Chains 36 and 38 are adjusted to provide sufficient tension on springs 32 and 34 to cause the furrows to be of a height of several inches from crest to trough.

Referring to FIG. 5, the upright distance between the crest and the trough is much greater after furrowing than that which is obtained by plowing alone. Specifically, broken line 92 of FIG. 5 depicts the height of the furrows created by plowing alone, and the solid line 94 indicates the improved deeper furrows created by furrowing immediately following plowing with known moldboard bottoms.

The distance between the field cultivators depends upon the size of the moldboard plow. To obtain the most efficient use of the assembly, the cultivators are aligned with the moldboard plow (in the direction of plow travel) so that the cultivators enhance the furrows created by the plow. Specifically, I have found that the most satisfactory operation occurs when the cultivators are spaced apart by the same distance as the bottoms of the moldboard plow and are directly behind the upright portion of the plowshare (or in line with coulter, if used). Alternatively, however, the first or last cultivator mounted on the bar may overlap the plow on one side or the other. This is best shown in FIG. 1, wherein the field cultivator 48 extends out to the right side of the plow to cause furrowing in the freshly plowed soil created by the previous pass.

Also, it may be advantageous to provide a cultivator behind every other bottom of the moldboard plow, thus providing furrows which are spaced farther apart.

In field trials, newly plowed soil was provided with furrows which varied in depth some 6-8 inches from crest to trough. Snowfall accumulation in the furrows remained, even though the ridges between the furrows were blown clear of snow, indicating a desirable trapping of moisture upon the field. Further, soil from the exposed ridges appeared to have been captured upon the snow accumulation in the furrows indicating a desirable lessening of soil erosion from wind. It is expected that such fall-plowed and immediately-furrowed soil of a sinuous cross section will have a beneficial effect upon spring rain runoff. Often heavy spring rain tends to erode a plowed field, thereby carrying top soil to surrounding roadside ditches. Furrows in the plowed field are expected to catch and retain rainfall, minimizing such soil erosion.

I claim:

1. In an agricultural furrowing assembly having at least two spaced-apart support arms detachably secured at their forward ends to a beam rigidly attached to a moldboard plow, said plow having a plurality of spaced-apart bottoms thereon and said beam being positioned above the bottoms, an elongated bar assembly pivotably attached to the rear ends of the support arms, the improvement comprising:

a single row of rod-like mulching teeth secured to one side of the elongated bar assembly and extending upwardly therefrom;

a plurality of short tool bars attached to the elongated bar assembly and extending therefrom generally perpendicular to the direction of travel;

a plurality of field cultivators having shanks, the shank of each of said plurality of field cultivators being attached to one of said short tool bars with the cultivators extending downwardly from the tool bars trailing said plow, said plurality of cultivators being spaced apart from each other by a distance substantially equal to the distance between said spaced-apart bottoms and in alignment with said bottoms to deepen the bottom created furrow, each of said plurality of cultivators having a field-furrowing shank and share for furrowing the ground to increase moisture retention and to minimize wind erosion.

2. The furrowing assembly of claim 1 wherein said mulcher bar is rigidly attached to a plurality of support bars, said support bars being pivotably attached to said support arms.

3. The furrowing assembly of claim 2 wherein said support bars are adjustable in height to ground with respect to said support arms.

4. The furrowing assembly of claim 2 wherein said mulcher bar is rigidly attached to the plurality of support bars by individual removable brackets.

5. The furrowing assembly of claim 4 wherein the individual brackets are adapted to receive said mulcher bar in either of reversed positions so that said teeth on said mulcher bar are downwardly extending and said field cultivator means are upwardly extending and vice versa.

6. In an agricultural furrowing assembly having at least two spaced-apart support arms detachably secured at their forward ends to a beam rigidly attached to a moldboard plow, said plow having a plurality of spaced-apart bottoms thereon and said beam being positioned above the bottoms, an elongated bar assembly pivotably attached to the rear ends of the support arms, the improvement comprising:

support bars pivotably attached to the rear ends of the support arms;

a mulcher bar attached to the support bars, said mulcher bar including a plurality of teeth mounted thereon;

spring means coupled between the support arms and the support bars for urging the mulcher bar downwardly;

and a plurality of field cultivators coupled to the mulcher bar trailing said plow and urged downwardly by said spring means, said plurality of cultivators being spaced apart from each other by a distance substantially equal to the distance between said spaced-apart bottoms and in alignment with said bottoms to deepen the bottom created furrow, each of said plurality of cultivators having a field-furrowing shank and share for furrowing the ground to increase moisture retention and to minimize wind erosion.

7. The furrowing assembly of claim 6 wherein said spring means are adjustable.

* * * * *